May 12, 1964
D. S. STRADER
3,132,568
PACKING SET
Filed March 5, 1962
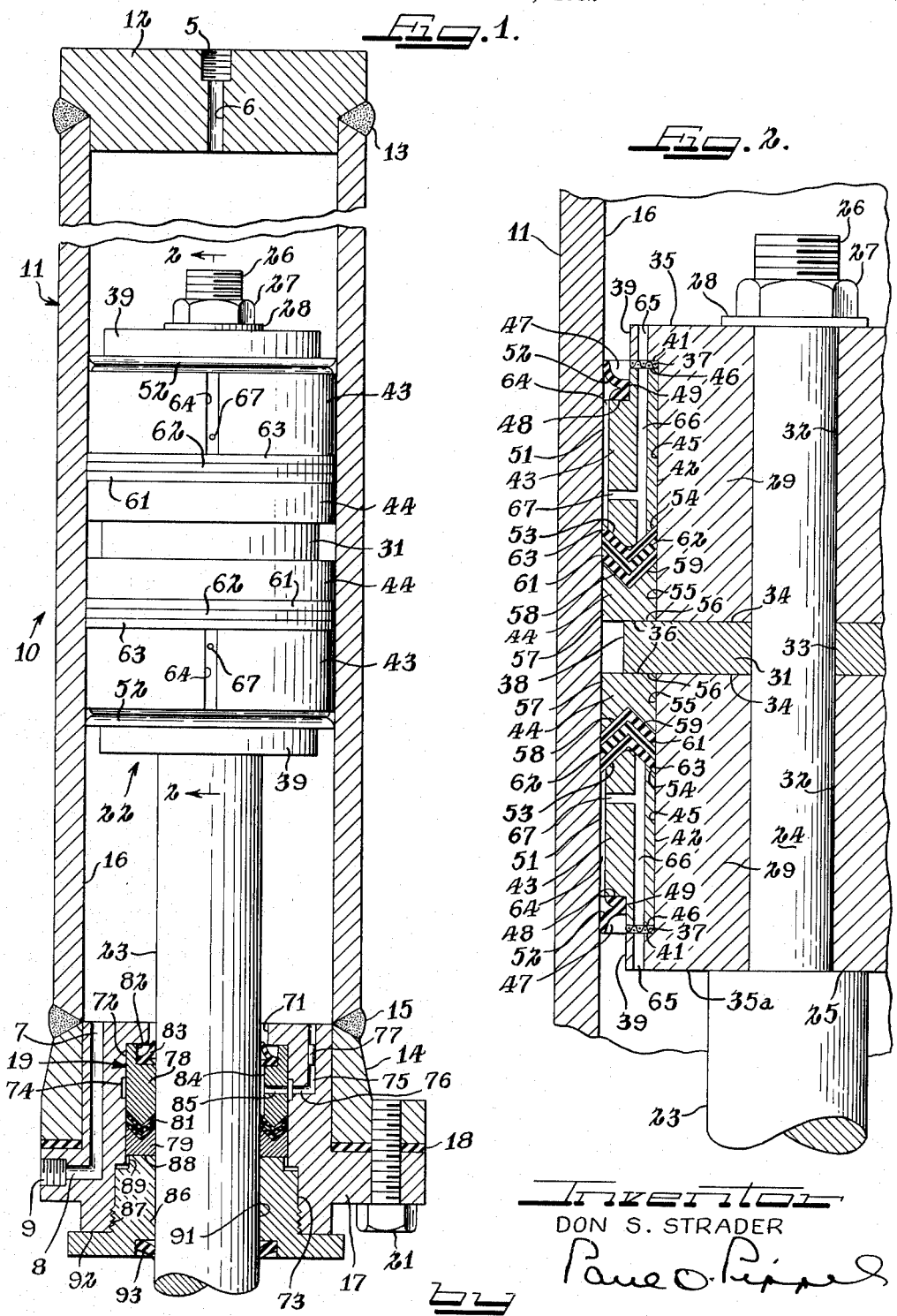
INVENTOR
DON S. STRADER

United States Patent Office 3,132,568
Patented May 12, 1964

3,132,568
PACKING SET
Don S. Strader, Mount Prospect, Ill., assignor to The Frank G. Hough Co., a corporation of Illinois
Filed Mar. 5, 1962, Ser. No. 177,454
7 Claims. (Cl. 92—78)

This invention relates generally to the art of hydraulic packing, and more particularly to an improved self-sealing hydraulic packing set for reciprocating movement with respect to a sealable surface.

In laminated sealing ring construction of hydraulic packing sets which engage the bore of the cylinder or surface of the rod and which are further compressible by the hydraulic fluid pressure to form a tight seal against leakage of fluid along said sealed surface, the major problem is to prevent damage or destruction of the sealing rings in the packing set during reciprocating motion. One solution is to employ wiper rings in combination with the sealing rings on the packing set assembly associated, for example, with the piston. The purpose of the wiper rings is to prevent any foreign solids or particles from becoming in contact with said sealing ring.

It is therefore an object of this invention to provide a packing set assembly with wiper rings of simple construction, easy to service, and of long life.

It is another object of this invention to provide a packing set assembly with a wiper ring that will prevent foreign solids from contacting the sealing rings and shorten the life thereof and also prevent solids from contacting the bearing surfaces of the packing set.

Still another object is to provide a packing set assembly on a piston or rod that permits pressure fluid on opposite sides of the wiper ring to improve the wiper action of the wiper ring in preventing foreign solids from contacting the seal ring.

It is still another object of this invention to provide a packing set assembly having passageways therethrough for communication of pressure fluid between the wiper ring and the sealing ring to expand the sealing ring into further or increases contact with the sealed surface to improve the sealing action.

Still another object is to provide a packing set assembly having passageways therethrough for the admittance of pressure fluid between the wiper ring and the sealing rings and including a filter means in the passageways to remove any foreign solids in the fluid between the wiper ring and the sealing ring or rings.

These and other objects and advantages of this invention will be apparent from a consideration of the following specification, read in connection with the accompanying drawings, wherein:

FIGURE 1 is an elevational view, partly in cross section, of a device having a piston assembly therein in which packing sets constructed according to the invention are used to seal relatively moving surfaces; and FIGURE 2 is a fragmentary cross section in part of the piston taken along the lines 2—2 of FIGURE 1.

Turning next to a detailed description of the present invention, continued reference is made to the drawings. Although the drawings disclose a packing set construction in relation with a fluid cylinder and piston assembly; the packing set construction is intended to be used for other sealing applications. The fluid extensible device 10 is shown in FIGURE 1 which comprises a member 11 having a fluid cylinder bore or cylinrical inner wall 16 therethrough. At one end, a closure member 12 is attached in a suitable manner such as by a welding bead 13; at the other end, a flange member 14 is attached by a welding bead 15. Closure member 17 including a packing set 19 is assembled to the flange member 14 through fastening bolt 21. A seal 18 is inserted between the flange portion of member 14 and closure member 17 to prevent any fluid leakage. The closure member 12 has a passageway 6 with a threaded end portion 5 for an entrance of fluid pressure by means of a control assembly not shown; similarly another fluid passageway 7 and 8 with a threaded end portion 9 is shown with the closure member 17. The piston assembly slidable in the cylinder 16 is generally indicated by the reference number 22 and includes a piston rod 23 which extends outwardly through bore 91.

The piston itself comprises three elements assembled together through their identical concentric bores 32 and 33 on the extension portion 24 of the rod 23 against the shoulder 25 through nut 27 and washer 28 on threaded end 26. The two elements 29 are identical in construction so only one element 29 will be explained in detail hereinafter, with like reference numbers corresponding to like parts unless otherwise specified. Inner radial surface 34 of the element 29 is in contact with one of the radial surfaces 36 of the spacer 31. The circumferential surfaces of the elements 29 comprise an outer surface 42 connected to inner surface 34 at one end and connected to a radial wall 41 at the other end which connects with the outer surface 39. The head and rod end of the piston is defined by the outer radial faces 35 and 35a which are each connected to outer surface 39 of each element 29.

The packing set assembly is inserted in an annular longitudinal reduced portion defined by the spacer surface 36, and the radial wall 41 and the outer surface 42 of each element 29. This assembly in the reduced portion comprises a filter means such as a circular screen 37, inner and outer circular members or adapters 43 and 44 of a suitable bearing material, and three V-shaped sealing rings 61 to 63. The inner surfaces 45 and 55 of the adapters 43 and 44 engage the outer surface 42 of element 29. The adapter outer surfaces 51 and 57 which act as piston bearings for piston assembly 22 are slightly less in diameter than the cylinder 16 and are greater in diameter than the spacer outer surface 38 and outer surface 39 of element 29. One end of the outer adapter 43 includes an annular recess 47 and an end surface 46 connected thereto. The annular recess 47 comprises a circular surface 49 connected to a shoulder 48; whereby a circular wiper ring 52 can be mounted and securely attached in the annular recess 47 to contact the cylinder 16. The circular screen 37 is placed between the radial wall 41 and outer adapter end surface 46 and contacts outer surface 42 of element 29. Surface 56 at one end of the inner adapter 44 contacts spacer surface 36. The three V-shaped sealing rings 61 to 63 are interposed between the V-shaped projection having inclined surfaces 53 and 54 of the outer adapter 43 and the V-shaped recess including inclined surfaces 58 and 59 of the inner adapter 44 to provide a firm packing set assembly in the defined groove in combination with the adapters 43 and 44 and screen 37. The three sealing rings 61 to 63 contact the outer surface 42 of the element 29 and also contact the cylinder 16 to provide sealing action preventing fluid pressure bypass from either end 35 and 35a of the piston. The wiper ring 52 and sealing rings 61 to 63 can be constructed of an elastomer material or any suitable material known in the art. Thus the functions of adapters 43 and 44 are to assemble the sealing rings 61 to 63 on piston assembly 22, to attach the wiper rings 52 at the outer end of adapter 43, and to provide an outer bearing surface 51 and 57 for piston assembly 22 reciprocating in cylinder bore 16.

A longitudinal passageway 65 extends through either end 35 and 35a of the piston; and another longitudinal passageway 66 extends through the outer adapter 43 in fluid communication with the passageway 65 through screen 37. A radial passageway 67 extends from the outer surface 51 to the passageway 66 to provide communication therewith. The purpose of the screen 37 between passageways 65 and 66 is to remove suspended foreign solids from the pressure fluid that flows through passageways 66 and 67 to occupy the longitudinal groove 64 extending the length of adapter outer surface 51 between the sealing rings 61 to 63 and wiper ring 52. Although only one longitudinal passageway has been shown in the drawings in each element 29 and each adapter 43 in fluid communication with the radial passageway 67 and groove 64, more fluid passageways and grooves could be added, including different sizes, to achieve desired operational results of a piston assembly reciprocating in the fluid cylinder 16.

The screened pressure fluid in passageways 66 and 67 and outer surface groove or recess 64 improves the sealing action of the sealing ring 61 to 63 against the cylinder 16 by tending to expand the sealing rings 61 to 63 radially outwardly. A further purpose of the screened pressure fluid in the recess 64 is to equalize or substantially equalize the fluid pressure on opposite sides of the wiper ring 52 to improve its wiper action. Without the screened pressure fluid in the groove 64, the pressure fluid at the head end 35 or piston end 35a containing foreign solids would tend to compress the wiper ring in contact with the fluid cylinder 16; so that eventually the foreign solids would become imbedded in the wiper ring resulting in eventual damage to the wiper ring, outer bearing surface of adapters 43 and 44, and sealing rings 61 to 63. Thus having pressure fluid on opposite sides of the wiper ring 52 assures improved wiper action that prevent imbedding of suspended foreign solids.

Although not heretofore mentioned, it should readily be apparent to those skilled in the art that if pressure fluid is used only at one end of the piston, such as the head end 35, the piston assembly needs only to include one wiper ring 52 and one set of sealing rings, such as 61 to 63. Further the outer adapter 43 has been shown to be of greater length than the inner adapter 44. However, it is also apparent that the adapters 43 and 44 could be of the same length or different lengths than shown. It is also possible to employ only one adapter between the radial wall 41 and spacer surface 36 to achieve the objects of the present invention. It is also apparent that the packing set is applicable to all styles of sealing rings and packing requirements.

Referring to FIGURE 1 a detailed construction of a packing set in combination with the closure member 17 will now be described in detail. The closure member comprises a stepped bore having three bores 71, 72 and 73 with a connecting shoulder between each bore and with the smaller bore 71 adjacent the fluid cylinder bore 16. In intermediate bore 72 of the closure member, a circular recessed portion 74 is connected to a fluid passageway comprising a radial passageway 76 connected to a longitudinal passageway 75 in communication with the fluid within the cylinder 16. A suitable filter means such as a plug 77 consisting of screen material is inserted in the passageway 75, so that it can be easily removed. The plug 77 functions similarly to the screen or filter means 37 in piston elements 29 to remove foreign solids from the fluid flowing into recess portion 74. Circular adapters 78 and 79 engage bore 72 and have an outer surface similar to the outer surface 51 and 57 in adapters 43 and 44 for bearingly engaging the surface of rod 23. A V-shaped sealing ring 81 of similar construction to sealing rings 61 to 63 of the piston assembly 22 are assembled between adapters 78 and 79 in the intermediate bore 72. A wiper ring 83 similar in construction to wiper ring 52 is mounted in a circular or annular recess 82 at the fluid end of adapter 78. Outer bore 73 of the closure member 17 includes a threaded portion 87 near its outer end for assembling a circular fastening nut 86 having a reduced end portion 89 connected to its inner end face 88 to contact the adapter 79. The reduced portion 89 of the fastening nut 86 should be less than the intermediate bore 72 so that upon fastening the nut 86 to threaded portion 87, the end face 88 substantially compresses the packing set assembly 19 to provide a firm packing set assembly. Nut 86, properly fastened, includes an outer shoulder face 92 that should at most slightly contact the outer surface of the closure member 17. Further diameter of bore 91 through fastened nut 86 should be such as to permit easy sliding action of the rod 23 when the piston assembly 22 is moved. The dust seal 93, available commercially, is assembled in a counterbore, not indicated, of the nut 86 to prevent entry of any dust from the atmosphere to the packing set assembly 19.

The adapters 78 and 79 are constructed of a similar bearing material as adapters 43 and 44 and can be of different lengths 78, as shown, or of similar lengths as mentioned in regard to the adapters 43 and 44. Further, as shown in FIGURE 1, one radial passageway 85 has been connected to the passageway 75, 76 through circular recessed portion 74 in bore 72. Connected to passageway 85, the longitudinal groove or passageway 84 in outer bearing surface of adapter 78 extends between the wiper ring 83 and sealing ring 81 to provide communication of filtered or screened fluid therebetween.

In view of the foregoing detailed discussion set forth above, the operation of the present invention will be set forth below. As a flow of pressure fluid is entered alternately through either end of the fluid cylinder 16 through threaded openings 25 and 27 by a control device (not shown) the piston assembly 22 will reciprocate in the cylinder bore 16.

Assuming that the flow of pressure fluid enters the cylinder at the head end 35, the fluid flow will force the piston assembly 22 downwardly in FIGURE 1. The pressure fluid containing suspended foreign solids will attempt to by-pass the wiper ring 52 on the head end side. However, the flow of screened pressure fluid in passageway 66 and recess 64 will equalize the pressure on the recess side of the wiper ring 52 to improve the wiper action on the cylinder bore 16 preventing bypass of suspended foreign solids. Although the screened pressure fluid in the passageways 64 and 66 is contacting the sealing rings 61 to 63, it will improve their sealing action and, in turn, prevent the bypass of pressure fluid to the rod end 35a of the piston. Simultaneously as the piston assembly 22 moves downwardly the exiting flow of fluid containing suspended foreign solids at the rod end 35a is prevented from entering the piston bearing surfaces 51 and 57 of adapters 43 and 44 by the wiper ring 52. However, the screened fluid at the rod end 35a in passageway or groove 64 equalizes the fluid pressure on opposite sides of the wiper rign 52 and increases contact of sealings rings 61 to 63.

Thus applicant has provided an invention of simple construction and of long service life that provides a wiper ring action to prevent the entry of suspended foreign solids to contact and damage the sealing rings 61 to 63 and outer bearing surfaces 51 and 57 of adapters 43 and 44 during operation. It should now be clearly evident that if the flow of pressure fluid is entered in the cylinder bore 16 at the rod end 35a for moving the piston assembly 22 upwardly in FIGURE 1, the same operation results would occur as set forth above when a flow of pressure fluid entered the cylinder bore 16 at the head end 35 of the piston.

The operation of the packing set 19 in cooperation with the reciprocating rod 23 will now be set forth. The outer surfaces of adapters 78 and 79 are in sliding bearing contact with the outer surface of rod 23 and in conjunction with the screened fluid entering from cylinder 16 through passageways 75 and 76 to flow through passageways 84 and 85 in the adapter 78 through connecting circular recessed portion 74 in bore 72. The screened pressure fluid between wiper ring 83 and sealing ring 81 improves the wiper action 83 to prevent passage of foreign solids in the fluid pressure in cylinder bore 16 through the smallest bore 71 in closure member 17. Further, the screened pressure fluid passageway 84 of the adapter bearing surface increases the sealing contact of the sealing rings 85. Thus, as the rod 23 reciprocates relative to the closure member with its packing set 19, fluid within cylinder 16 is prevented from passing out of the closure member 17. Further, the fastening nut 86 through the dust seal 93 prevents the entrance of dust material in the atmosphere.

1. A fluid extensible device including relatively axially movable members, one of said members providing an outer axial reduced portion therein, two adapters mounted in said reduced portion, said mounted adapters providing an outer surface which extends beyond said one member to be in slidable bearing contact with the other of said members, a sealing member interposed between said adapters in said reduced portion to provide an assembly, said sealing member in contact with the other member to prevent the bypass of pressure fluid between said relative axial movable members, a wiper member including opposite sides mounted on the outer surface of one of said adapters, one of said opposite sides of said wiper member in contact with the other of said members to prevent the passage of suspended foreign solids in the pressure fluid to said sealing member and said adapters, a fluid passageway extending from an end of one of said members to said outer surface of one of said adapters, an axial groove in said outer surface of one of said adapters extending between and providing fluid contact to said sealing member and said wiper member, said groove being connected to said passageway, a filter means interposed in said passageway between said one member and said adapted, said filter means to prevent the passage of said foreign solids through said passageway; so that the filtered pressure fluid passing through said passageway to said groove substantially equalizes the pressure on said opposite sides of said wiper member, and further expands said sealing member into increased contact with the other of said members.

2. A fluid extensible device including relatively longitudinally axially movable circular members, two flange portions and an annular reduced portion on one of said members, said reduced portion between said flange portions, an annular adapter and sealing ring mounted in said reduced portion, said annular mounted adapter providing an outer surface which extends beyond said flange portions and said one member to be in slidable bearing contact with the other of said members, said sealing ring mounted in said reduced portion between said adapter and one of said flange portions, said sealing ring in contact with the other member to prevent the bypass of pressure fluid between said relatively movable circular members, a wiper ring including opposite sides mounted on the outer surface of said adapter between said sealing ring and the other of said flange portions, one of said opposite sides of said wiper ring in contact with the other of said members to prevent the passage of suspended foreign solids in the pressure fluid to said sealing ring and said adapter, a fluid passageway extending from said one member to said outer surface of said adapter, said passageway further extending along said outer surface between and providing fluid contact to said sealing ring and said wiper ring, a filter means interposed in said passageway between said one member and said adapter, said filter means to prevent the passage of said foreign solids through said passageway; so that the filtered pressure fluid passing through said passageway to said outer surface substantially equalizes the pressure on said opposite sides of said wiper ring to improve said wiper ring contact with the other of said members, and further expands said sealing ring into increased contact with the other of said members.

3. A device including relatively axially movable members, one of said members providing an outer axial reduced portion therein, two adapters mounted in said reduced portion, said mounted adapters providing an outer surface which extends beyond said one member to be in slidable bearing contact with the other of said members, a sealing member interposed between said adapters in said reduced portion to provide an assembly, said sealing member being in contact with the other member to prevent the bypass of pressure fluid between said relative axial movable members, a wiper member including opposite sides mounted on the outer surface of one of said adapters, one of said opposite sides of said wiper member in contact with the other of said members to prevent the passage of pressure fluid to said sealing member, a fluid passageway extending from an end of one of said members to said outer surface of one of said adapters between and providing fluid contact to said sealing member and said wiper member; so that the pressure fluid passing through said passageway substantially equalizes the pressure on said opposite sides of said wiper member to improve wiper action, and further expands said sealing member into increased contact with the other of said members.

4. A device including relatively longitudinally axially movable circular members, two flange portions and an annular reduced portion on one of said members, said reduced portion between said flange portions, two annular adapters and a sealing ring mounted in said reduced portion, said annular mounted adapters providing an outer surface which extends beyond said flange portions and said one member to be in slidable bearing contact with the other of said members, said sealing ring mounted in said reduced portion between said adapters, said sealing ring being in contact with the other member to prevent the bypass of pressure fluid between said relatively movable circular members, a wiper ring including opposite sides mounted on the outer surface of one of said adapters between said sealing ring and the other of said flange portions, one of said opposite sides of said wiper ring in contact with the other of said members to prevent the passage of pressure fluid to said sealing ring, a fluid passageway extending from said one member to said outer surface of said one adapter, said passageway further extending along said outer surface between and providing fluid contact to said sealing ring and said wiper ring; so that the pressure fluid passing through said passageway to said outer surface substantially equalizes the pressure on said opposite sides of said wiper ring to improve said wiper ring contact with the other of said members, and further expands said sealing ring into increased contact with the other of said members.

5. A fluid extensible device comprising a fluid cylinder, a rod having an extension portion; a piston including a pair of piston elements and a spacer positioned therebetween on said extension portion, said piston slidable in said cylinder, a flange portion provided by each of said elements; said flange portions and said spacer having a diameter less than said cylinder, a head end and a rod end of said piston provided by said flange portions, a reduced portion on each of each of said elements between said spacer and each of said flange portions, inner and outer adapters mounted in each of said reduced portions, an outer surface of said adapters greater in diameter than said piston spacer but less than said cylinder, a sealing ring interposed between the inner and outer adapters in each of said reduced portions to provide a firm assembly, said sealing rings in contact with said cylinder to prevent bypass of the pressure fluid from said piston ends, a wiper ring including opposite sides mounted on the outer surface of each of the outer adapters, one of said opposite sides of said wiper rings in contact with said cylinder to prevent the passage of suspended foreign solids in the pressure fluid to said sealing rings, a longitudinal passageway extending through each of said piston ends and each of said outer adapters, a radial passageway extending from each of said outer surfaces between said wiper ring and said sealing ring to said longitudinal passageways and in communication therewith, said radial passage being in fluid contact relation to said wiper ring and sealing ring, a screen interposed in said passageways between each of said piston ends and said outer adapters, said screen to prevent the passage of said foreign solids through said passageways; so that the screened pressure fluid passing through said passageways equalizes the pressure on said opposite sides of said wiper rings, and further expands said sealing rings into increased contact with said cylinder.

6. A fluid extensible device comprising a fluid cylinder having an inner cylindrical wall, a piston rod providing an extension portion, a piston including two spaced-apart flange end portions and an annular reduced portion therebetween, said piston being assembled on said rod extension to slide in said inner wall, said flange end portions having a diameter less than said inner wall and one defining a head end portion and the other a rod end portion, two adapters mounted in said reduced portion, an outer surface of said adapters having a diameter less than said inner wall, a sealing ring interposed between said adapters in said reduced portion to provide a firm assembly, said sealing ring in contact with said inner wall to prevent bypass of the pressure fluid from one of said piston ends, a wiper ring including opposite sides mounted on the outer surface of one of the adapters, said wiper ring in contact with said inner wall to prevent the passage of suspended foreign solids in the pressure fluid to said sealing ring, a pasageway extending through one of said piston ends and through one of said adapters outer surface between said wiper ring and said sealing ring, said passageway being in fluid contact with said wiper and sealing rings, a filter means interposed in said passageway between one of said piston ends and said outer adapter, said filter means to prevent the passage of said foreign solids through said passageway so that filtered pressure fluid passing through said passageway equalizes the pressure on the opposite sides of said wiper ring to improve wiper action and expands said sealing ring into increased contact with said inner wall.

7. A fluid extensible device comprising two relatively coaxially movable cylindrical members, one of said members having a reduced cylindrical portion providing an axially extending annular recess between said one member and the other member, said members including a fluid pressure chamber, said one member including an adapter forming one end of said recess, a second adapter disposed in said recess, said second adapter being in sliding contact with the other of said members, an annular sealing member carried in said recess between said adapters, said sealing member being in contact with said other member to prevent the by-pass of fluid under pressure between said cylindrical members, an annular wiper member having opposite sides carried by one of said adapters and movable with one of said opposite sides to slidingly wipe said other member to prevent the passage of fluid under pressure to said sealing member and said other side being disposed in said fluid pressure chamber, fluid passage means carried by said one member in communication with said fluid pressure chamber, said passageway extending between and being in fluid contact with said sealing member and said one side of said wiper member, so that fluid under pressure from said chamber through said passageway substantially equalizes the pressure on said opposite sides of said wiper member to improve wiper action, and further expands said sealing member into increased contact with the other of said members.

References Cited in the file of this patent
UNITED STATES PATENTS

| | | |
|---|---|---|
| 29,621 | Robinson | Aug. 14, 1860 |
| 819,448 | Meyers | May 1, 1906 |
| 2,007,501 | Millimine | July 9, 1935 |
| 2,188,957 | Pfauser | Feb. 6, 1940 |
| 2,211,456 | Caldwell | Aug. 13, 1940 |